(12) United States Patent
Collins, Jr.

(10) Patent No.: US 7,546,953 B1
(45) Date of Patent: Jun. 16, 2009

(54) SYSTEM FOR MOUNTING A HANDHELD BARCODE SCANNER

(75) Inventor: Donald A. Collins, Jr., Dawsonville, GA (US)

(73) Assignee: NCR Corporation, Dayton, OH (US)

( * ) Notice: Subject to any disclaimer, the term of this patent is extended or adjusted under 35 U.S.C. 154(b) by 427 days.

(21) Appl. No.: 11/288,922

(22) Filed: Nov. 29, 2005

(51) Int. Cl.
*G06K 7/10* (2006.01)
(52) U.S. Cl. .............................. 235/462.43; 235/462.14
(58) Field of Classification Search ................................ 235/462.01–462.49
See application file for complete search history.

(56) References Cited

U.S. PATENT DOCUMENTS

| | | | | |
|---|---|---|---|---|
| 5,185,514 A | * | 2/1993 | Wike et al. ................. | 235/375 |
| 5,214,270 A | * | 5/1993 | Rando .................... | 235/462.36 |
| 5,314,631 A | * | 5/1994 | Katoh et al. .............. | 235/462.4 |
| 6,860,424 B1 | * | 3/2005 | Philyaw et al. .......... | 235/462.32 |
| 7,051,939 B2 | * | 5/2006 | Hammer et al. ........ | 235/462.39 |

* cited by examiner

*Primary Examiner*—Jamara A Franklin
(74) *Attorney, Agent, or Firm*—Paul W. Martin (57) ABSTRACT

There is provided a system 1 for mounting a handheld barcode scanner 2. System 1 includes a cradle 3 for releasably mounting scanner 2 such that scanner 2 provides a first scanning beam 4 in a predetermined first scanning path 5. System 1 also includes an optical assembly 6 mountable to a bi-optic scanner 7. Assembly 6 is provided in path 5 for receiving beam 4. In response to receiving beam 4, assembly 6 provides a second scanning beam 9 in a second scanning path 10. Beam 9 supplements a third scanning beam, in the form of array 11, provided by bi-optic scanner 7.

22 Claims, 6 Drawing Sheets

SYSTEM FOR MOUNTING A HANDHELD BARCODE SCANNER

FIELD OF THE INVENTION

The present invention relates to a system for mounting a handheld barcode scanner. The invention has been primarily developed for providing additional functionality to a desktop barcode scanner, such as a bi-optic scanner. However, the invention is by no means restricted to that field of use, and has various alternate applications.

BACKGROUND

Any discussion of the prior art throughout the specification should in no way be considered as an admission that such prior art is widely known or forms part of common general knowledge in the field.

It is common for a point of sale (POS) system to include two types of barcode scanner: a desktop scanner—such as an in counter bi-optic scanner—and a handheld scanner. These scanners each provide scanning beam for selectively reading barcodes. Where a scanning beam is appropriately directed toward a barcode, the barcode is read and an information packet provided to a processing unit.

Typically, a bi-optic scanner is provided for high performance throughput, allowing a large number of conventional items to be scanned in quick succession. The handheld scanner is provided for occasions where an item generally unsuitable for scanning using the bi-optic scanner. For example: particularly heavy items that are better scanned whilst contained in a shopping cart. Handheld scanners are particularly useful in such situations given their inherent portability. Which of the scanners is used for a particular item is typically based on an immediate determination of efficiency.

In known retail systems, the handheld scanner is only of use when manually held, and is typically otherwise disabled.

SUMMARY

It is an object of the present invention to overcome or ameliorate at least one of the disadvantages of the prior art, or to provide a useful alternative.

In accordance with a first aspect of the invention, there is provided a system for mounting a handheld barcode scanner, the system including:

a cradle for releasably mounting the handheld scanner such that the handheld scanner provides a first scanning beam in a predetermined first scanning path; and an optical assembly mountable to a bi-optic scanner for receiving the first scanning beam and in response providing a second scanning beam in a second scanning path to supplement a third scanning beam provided by the bi-optic scanner.

Preferably the handheld scanner is responsive to scanning alignment of a barcode in the second scanning path for reading the barcode. More preferably the first scanning beam is displayable on a planar surface as a line pattern.

In a preferred embodiment the optical module includes a turning mirror for re-directing the first scanning beam. In some cases the optical module includes a magnifier for magnifying the first scanning beam. In one embodiment the optical assembly includes a rastering component. Preferably the rastering component translates a line pattern into a 2D barcode reading pattern.

Preferably the cradle is fixedly mountable to the bi-optic scanner. More preferably the optical assembly is substantially containable within the bi-optic scanner. The cradle preferably includes a terminal engageable with a complimentary socket on the handheld scanner for providing electrical power to the handheld scanner.

Preferably the bi-optic scanner includes a scanning window and the second scanning beam is directed toward an inner surface of the scanning window. More preferably the second scanning beam is visible as a line pattern extending across a portion of the scanning window. In some embodiments the second scanning beam is visible as a 2D barcode reading pattern on the scanning window.

Preferably the handheld scanner is responsive to scanning alignment of the second scanning beam and a barcode for providing a first data packet to a processing unit and the bi-optic scanner is responsive to scanning alignment of the third scanning beam with a barcode for providing a second data packet to the processing unit. More preferably the processing unit is responsive to receiving a like first and second data packet within a predetermined time period for performing an action. In some embodiments the action is disregarding one of the first and second data packets. In other embodiments the action is providing a message to an operator of either or both of the scanners.

In some embodiments the bi-optic scanner includes a plurality of turning mirrors for producing the third scanning beam from a beam source, and the optical assembly includes one or more of these turning mirrors.

According to a second aspect of the invention, there is provided a mount for a handheld scanner, the mount including:

a cradle for releasably mounting the handheld scanner such that the handheld scanner provides a first scanning beam to an optical assembly mounted to a bi-optic scanner, the assembly being responsive to the first beam for providing a second scanning beam in a second scanning path to supplement a third scanning beam provided by the bi-optic scanner.

According to a further aspect of the invention, there is provided an optical assembly mountable to a bi-optic scanner, the assembly including:

an input for receiving a first scanning beam from a handheld scanner;

an optical module optically associated with the input and responsive to the first scanning beam for providing a second scanning beam; and an output optically associated with the module for providing the second scanning beam in a second scanning path such that the second scanning beam supplements a third scanning beam provided by the bi-optic scanner.

According to a still further aspect of the invention, there is a provided bi-optic scanner for providing a bi-optic scanning beam outwardly through at least one window, the scanner including:

a cradle for releasably retaining a handheld scanner that provides a handheld scanning beam; and an optical assembly for receiving the first scanning beam and in response providing a further scanning beam outwardly through one of the windows.

Preferably the optical assembly is responsive to receiving the handheld scanning beam for providing a further scanning beam outwardly through more than one of the windows.

BRIEF DESCRIPTION OF THE DRAWINGS

Benefits and advantages of the present invention will become apparent to those skilled in the art to which this invention relates from the subsequent description of exemplary embodiments and the appended claims, taken in conjunction with the accompanying drawings, in which:

DETAILED DESCRIPTION

Referring to the drawings, it will be appreciated that, in the different figures, corresponding features have been denoted by corresponding reference numerals.

Figure 1:
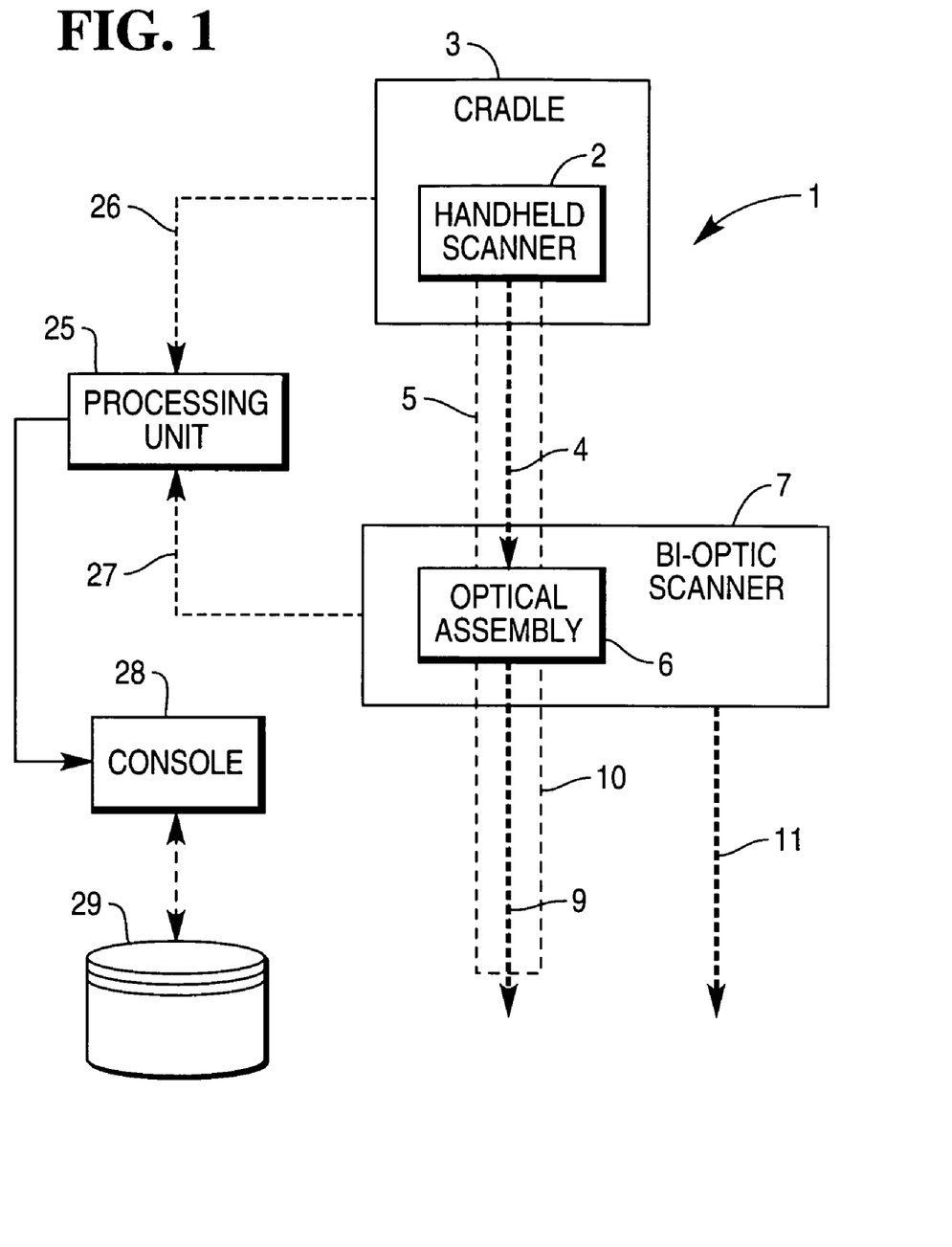
FIG. 1 is a schematic representation of a system for mounting a handheld barcode scanner.

FIG. 1 illustrates a system 1 for mounting a handheld barcode scanner 2. System 1 includes a cradle 3 for releasably mounting scanner 2 such that scanner 2 provides a first scanning beam 4 in a predetermined first scanning path 5. System 1 also includes an optical assembly 6 mountable to a bi-optic scanner 7. Assembly 6 is provided in path 5 for receiving beam 4. In response to receiving beam 4, assembly 6 provides a second scanning beam 9 in a second scanning path 10. Beam 9 supplements a third scanning beam, in the form of array 11, provided by bi-optic scanner 7.

Figure 2:
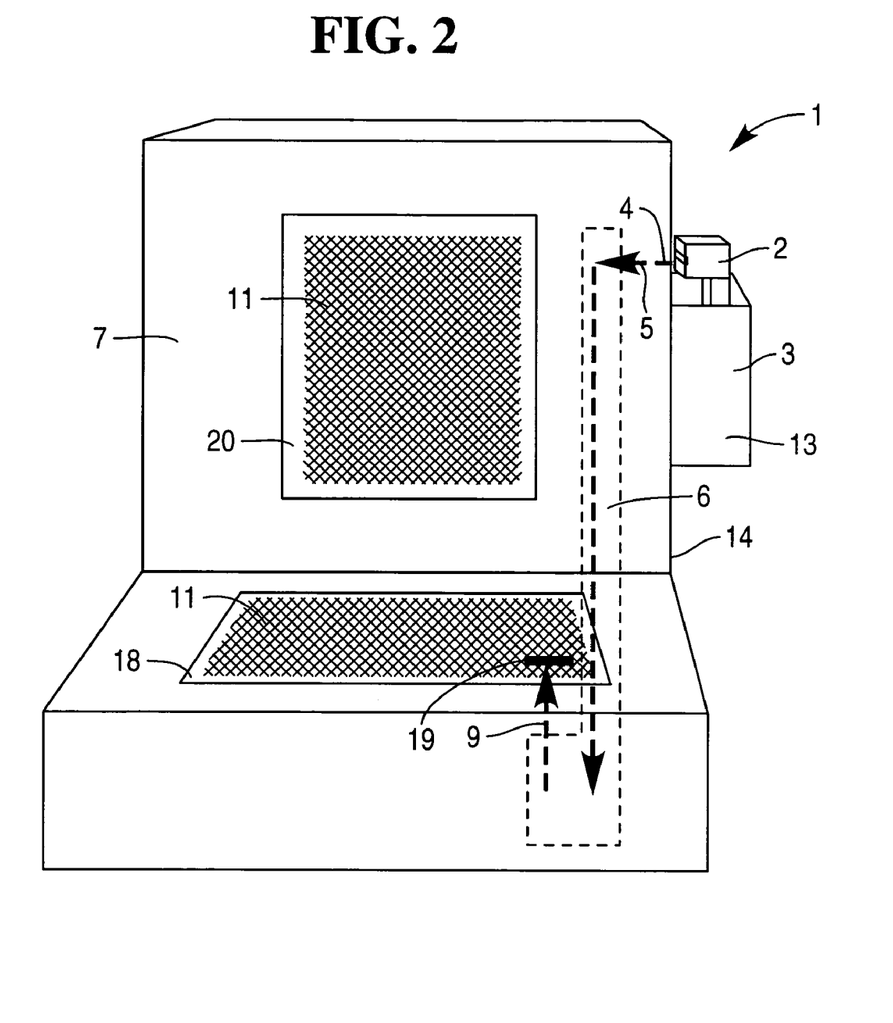
FIG. 2 is a perspective representation of the system of FIG. 1.
Figure 3:
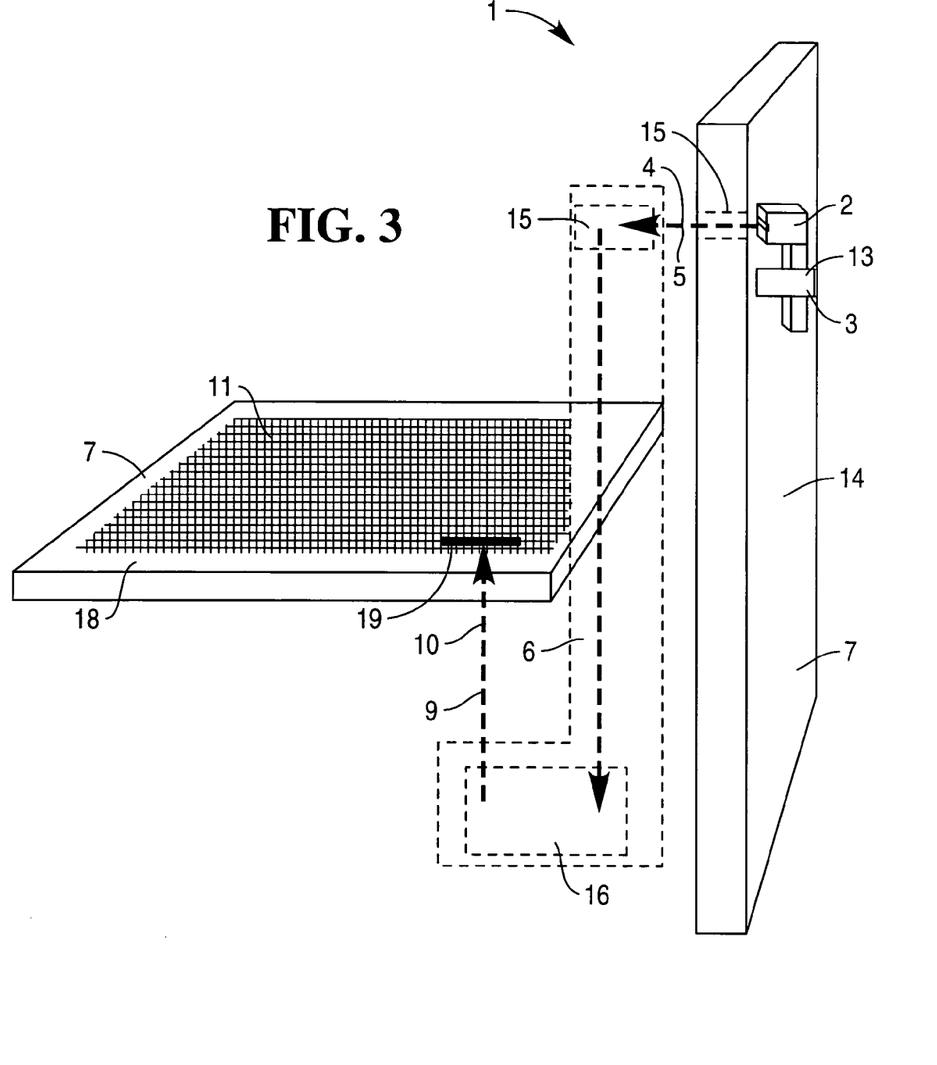
FIG. 3 is a cutaway perspective representation of the system of FIG. 1.

The precise form of cradle 3 varies between embodiments depending on the size and shape of a particular scanner 2, as well as the location of path 5. It will be appreciated from the present disclosure that the primary function of cradle 3 is directing beam 4 in path 5. Those skilled in the art will recognize various cradle designs that are particularly appropriate, and readily modify existing cradle designs to achieve the required functionality. In the illustrated embodiments, cradle 3 includes a molded plastic sleeve 13 for captively receiving scanner 2 and guiding beam 4 into a desired alignment. This sleeve is fixedly mounted to a sidewall 14 of scanner 7 such that beam 4 is directed through this sidewall and toward the interior of scanner 7. For this purpose, scanner 7 is modified to include an aperture 15 or otherwise transparent portion through which path 5 extends. This aperture is typically regarded as a component of assembly 6, and is often formed when mounting assembly 6 to scanner 7.

A sleeved design allows repeated and efficient insertion and removal of scanner 2. Although not shown in the drawings, cradle 3 includes a formation for best ensuring correct alignment of beam 4 with path 5. In the present embodiment scanner 2 is a wireless device having a charging socket. This socket is connected to a complimentary power terminal for charging internal batteries of scanner 2. The nature of the socket and terminal is such that a predefined alignment must be realized before connection is possible—such as the case with many known multi-pin charging arrays. The power terminal is fixedly attached to cradle 3 such that connection of the socket and terminal defines an appropriate positioning of scanner 2 in sleeve 13 for alignment of beam 4 with path 5.

In other embodiments, alternate techniques are used to achieve alignment of beam 4 with path 5, and these will be recognized by those skilled in the art. For example: visible markings, custom fittings, and so on. In embodiments where scanner 2 includes a tether for communicative connection with a processing unit and power source, cradle 3 typically includes a channel for receiving this tether. In some cases this channel is located on cradle 3 to encourage the alignment of beam 4 with path 5.

Assembly 6 is typically substantially contained within scanner 7 and includes one or more optical modules for redirecting, magnifying, rastering, or otherwise affecting beam 4 to form beam 9. These are mounted within scanner at separated by optically associated locations. Beam 9 is an adjusted continuation of beam 4. As such, beam 9 maintains sufficient linkage to scanner 2 to allow the reading of a barcode by scanner 2 using beam 4. On this basis, appropriate optical modules and assemblies 6 will be recognized by those skilled in the art. In the present embodiments beam 9 retains general barcode reading properties of beam 4. That is, beam 9 is functionally equivalent to a beam produced by a handheld scanner such as scanner 2.

In the present embodiment, assembly 6 includes a pair of turning components 15 and 16, each defined by one or more turning mirrors. The actual configuration of individual mirrors is not shown to maintain simplicity in illustration. The general direction of beams 4 and 9 is sufficient to demonstrate the functionality of components 15 and 16. In particular, beam 4 enters component 15 on a horizontal path 5, and is vertically downwardly directed. The beam then enters component 15, where it is transversely shifted and directionally reversed. This provides an upward beam 9 in path 10 directed toward the interior of a horizontal transparent scanning window 18 of scanner 7. This produces a visible line pattern 19 on window 18. In some embodiments one or more beam magnifiers are used to ensure or increase visibility of pattern 19 on window 18.

Pattern 19 identifies the location of scanning beam 9, which is particularly well suited for reading barcodes with which bi-optic scanners traditionally struggle. For example: highly truncated barcodes or damaged barcodes. In brief, where a user of scanner 7 encounters difficulty in reading a barcode in a manner conventional to scanner 7, that barcode is held vertically above pattern 19 in an attempt to read using scanner 2. The chances of reading are substantially increased, little time is wasted, and little effort is expended.

Scanner 7 also includes a vertical scanning window 20. In other embodiments path 10 is directed toward this scanning window as an alternative such that pattern 19 appears on window 20. In such cases a suitably varied assembly 6 is used. The preferred alignment and location of pattern 19 on a scanning window varies between embodiments, and is typically a matter of individual choice.

In some embodiments, assembly 6 makes use of optical components belonging to scanner 7. In particular, scanner 7 includes a plurality of turning mirrors for generating array 11. One or more of these mirrors are used by system 1 for the purpose of directing beam 4 to provide beam 9. How such existing mirrors are used will be recognized by those skilled in the art.

Scanner 2 has a predefined working read range. This range defines the approximate maximum displacement between the scanner and a barcode at which a barcode is readable. Assembly 6 should be designed by reference to this working read range. In particular, the optical path length between scanner 2 and pattern 19 should be less than the working read range to allow the reading of a barcode by beam 9 outside of scanner 7. Typically, the path length is selected such that a barcode is readable at a reasonable height above pattern 19. For example: where the read range is twelve inches, an appropriate path length is 9 inches. Other factors aside, this allows a barcode to be read at approximately 3 inches above pattern 19. In some cases, other factors affect the read range, and the optical path length is selected accordingly. As a general rule, the path length between scanner 9 and pattern 19 is minimized where possible to increase the likelihood of successful barcode reading.

Scanners 2 and 7 are connected to a common processing unit 25. Unit 25 receives data packets 26 and 27 indicative of barcode read information from each of scanners 2 and 7. These are provided to console 29, which uses these data packets to tally an account for payment. This typically involves querying a pricing information database 29.

Although it is known for a handheld and bi-optic scanner to share a common processing unit, it is not usual for their respective reading beams to overlap in the general course of operation. As such, it is often preferable to adjust handling protocols of unit 25 to reduce the risk of double reading. For example, where unit 25 receives a first data packet 26 from scanner 2 and a like second data packet 27 from scanner 7 (like in the sense that they identify the same barcode) within a predetermined time period, some action is taken. This action typically involves disregarding one of the two data packets and/or providing a message to an operator of the scanners.

Descriptions generic of point of sale (POS) systems and components are provided herein for the purposes of illustration only. Other such POS systems and components are used in alternate embodiments. That is, the disclosed generic systems and components should not be regarded as limiting in any way. For example, features and functionalities of scanners 7 are dependant on the actual bi-optic scanner used in a physical implementation. Disclosure of generic systems and components is provided to illustrate exemplary interactions with system 1. Those skilled in the art will readily recognize techniques for implementing system 1 on other known alternate POS systems and components.

Figure 4:
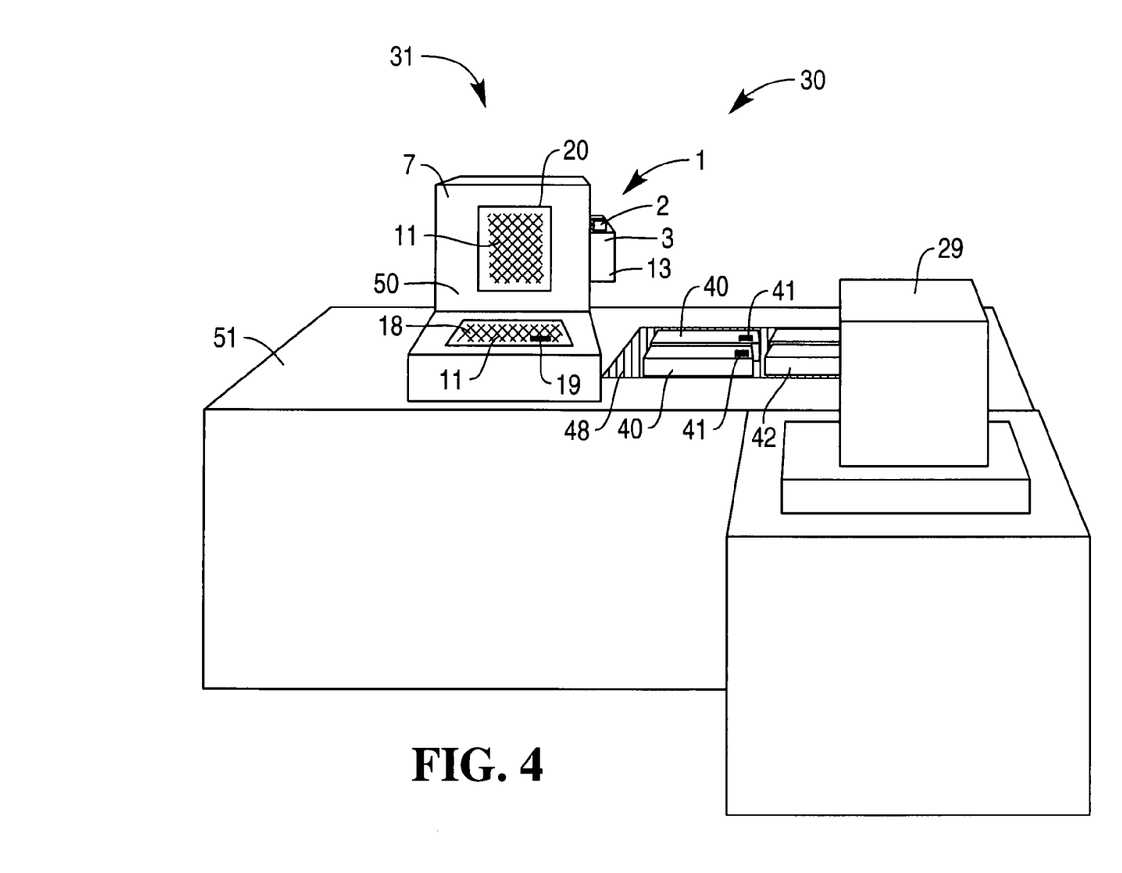
FIG. 4 is a perspective representation of a POS system.
Figure 5:
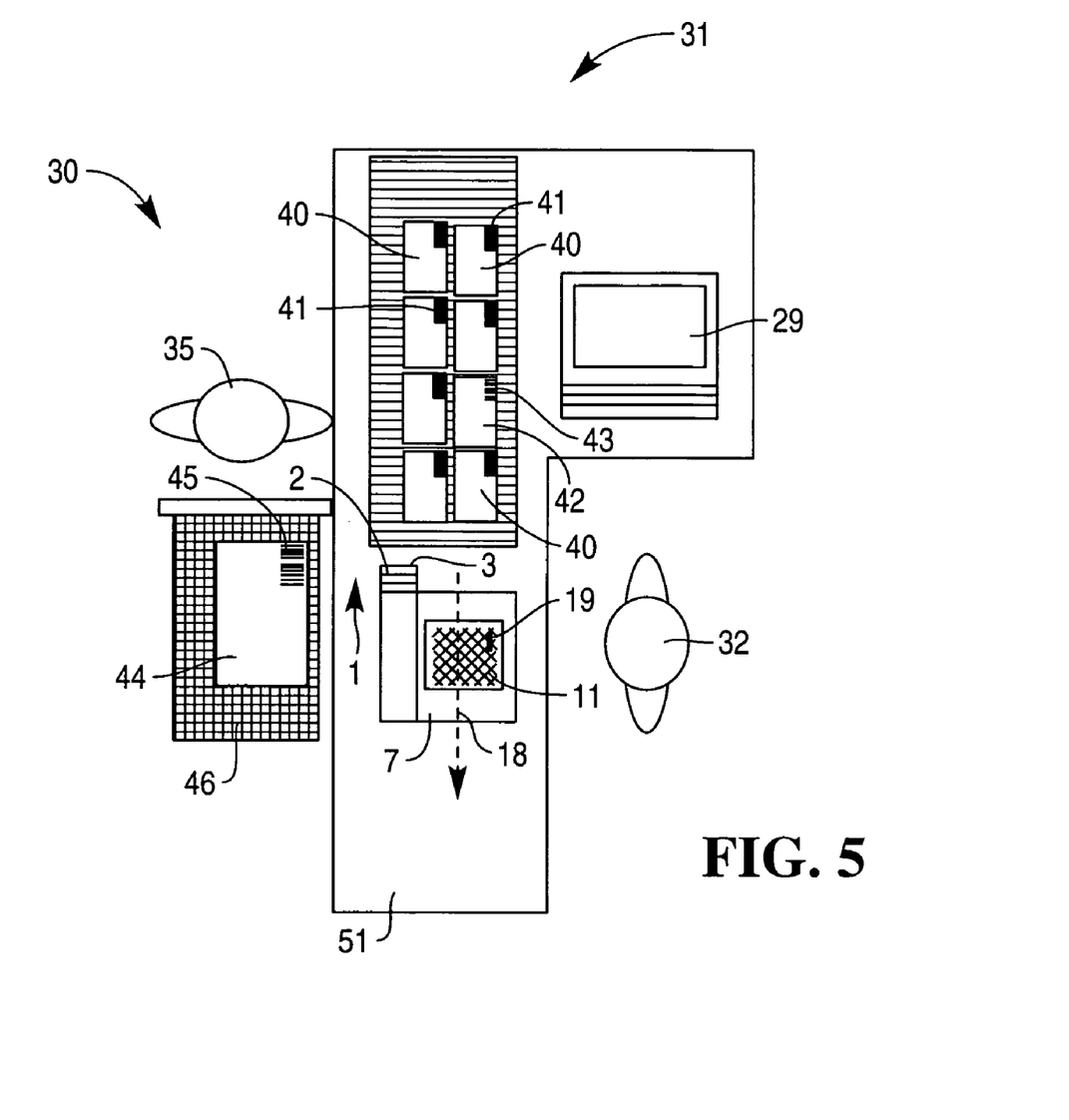
FIG. 5 is a plan view of the POS system of FIG. 4.

Referring to FIGS. 4 and 5, scanners 2 and 7 are interfaced by system 1 and implemented as parts of a POS system 30 located within a checkout zone of a supermarket 31. This POS system is attended an operated by an operator 32.

A consumer 35 collects various consumer items from within supermarket 31, and presents these items to operator 32 to pay for the items. For the sake of the present example, the following items are collected:
  A plurality of mid-sized items 40, each carrying a respective barcode 41.
  A mid-sized item 42 having a damaged barcode 43.
  A large item 44 having a barcode 45. The relative weight of item 44 and strength of consumer 35 make it preferable for item 44 to remains in a shopping cart 46.
  Items 40 and 42 are placed on a conveyor belt 48.

Operator 32 first passes the mid-sides items 40 and 42 through a scanning zone 50 defined by array 11 of scanner 7. This beam is in the form of a plurality of crossed beams of varying transverse path cross-section emanating through windows 18 and 20. Zone 50 is a region in three dimensional space approximately intermediate windows 18 and 20. The items are passed through this zone such that a side of the item that carries the barcode generally faces either or both of the windows. The items are individually manually passed though zone 50 in an order generally corresponding to their relative positions on conveyor belt 48. As each item 40 is passed, an audible tone is produced to indicate the reading of the relevant barcode 41. Once this tone is heard, the item is placed in a packing zone 51.

In the present embodiment the audible tone is provided by unit 25, which is contained within scanner 7. This tone designates a successful barcode read by either of scanners 2 and 7.

Scanner 7 provides a high throughput for items 40. That is, a relatively high number of items 40 are typically able to be scanned within a designated time period. This is a result of the nature of array 11, in particular the ability to read a barcodes on more than one side of item 40 and the fact that specific barcode alignment is not necessary. That is, item 40 is passed though zone 50 with little need for operator 32 to ensure any particular alignment, only that barcode 41 is generally facing toward scanner 7.

For the sake of example, when item 42 is passed through zone 50, an audible tone is not heard. Operator 32 is therefore informed that barcode 43 has not been read. In this case, operator 32 locates barcode 43, and holds it in a suitable alignment vertically above and facing pattern 19. For the sake of example, it is assumed that the more effective reading pattern of scanner 2 reads barcode 43, and as such the sought audible tone is produced. Item 42 is placed in zone 51, and the next item 40 is passed through zone 50.

It will be recognized that this provides a far more efficient procedure for reading damaged barcodes when compared with the prior art. In a prior art POS system including a scanner 2, it would be necessary to pick up the scanner 2, and then manipulate beam 4 to for alignment with barcode 43. This typically involves either placing item 42 on a counter in an appropriate configuration, or manipulating item 42 with one hand and scanner 2 with the other. Either of these operations reduces overall throughput of POS system 30. In prior art systems lacking a scanner 2 it is typically necessary to manually enter a numerical string provided on barcode 43 into console 29. This is also quite time consuming.

In another embodiment beam 9 passes through vertical window 20 in the approximate direction of window 18. Typically, an angle of or about 45 degrees is used. In such an embodiment pattern 19 is visible on both of windows 18 and 20. This not only provides visual identification of the location of beam 9, but also allows for visual alignment of beam 9 for the reading of barcode 43. For example, item 42 is held with barcode 43 facing generally upward in a region between the patterns 19 on windows 18 and 20. A line pattern becomes visible on the barcode-carrying surface of item 42, and this is brought into appropriate alignment with barcode 43 to affect reading. In some cases the beam is directed through window 20 to be visible on a surface adjacent window 20, such as the weighing plate of an integrated scale.

Having scanned items 40 and 42, operator 32 removes scanner 2 from cradle 3 for the purpose of scanning item 44. Operator 32 then reaches across conveyor belt 48 and aligns beam 4 suitably with barcode 50. An audible tone is provided to confirm a successful read. Scanner 2 is then replaced in cradle 3 for future usage via system 1.

Figure 6:
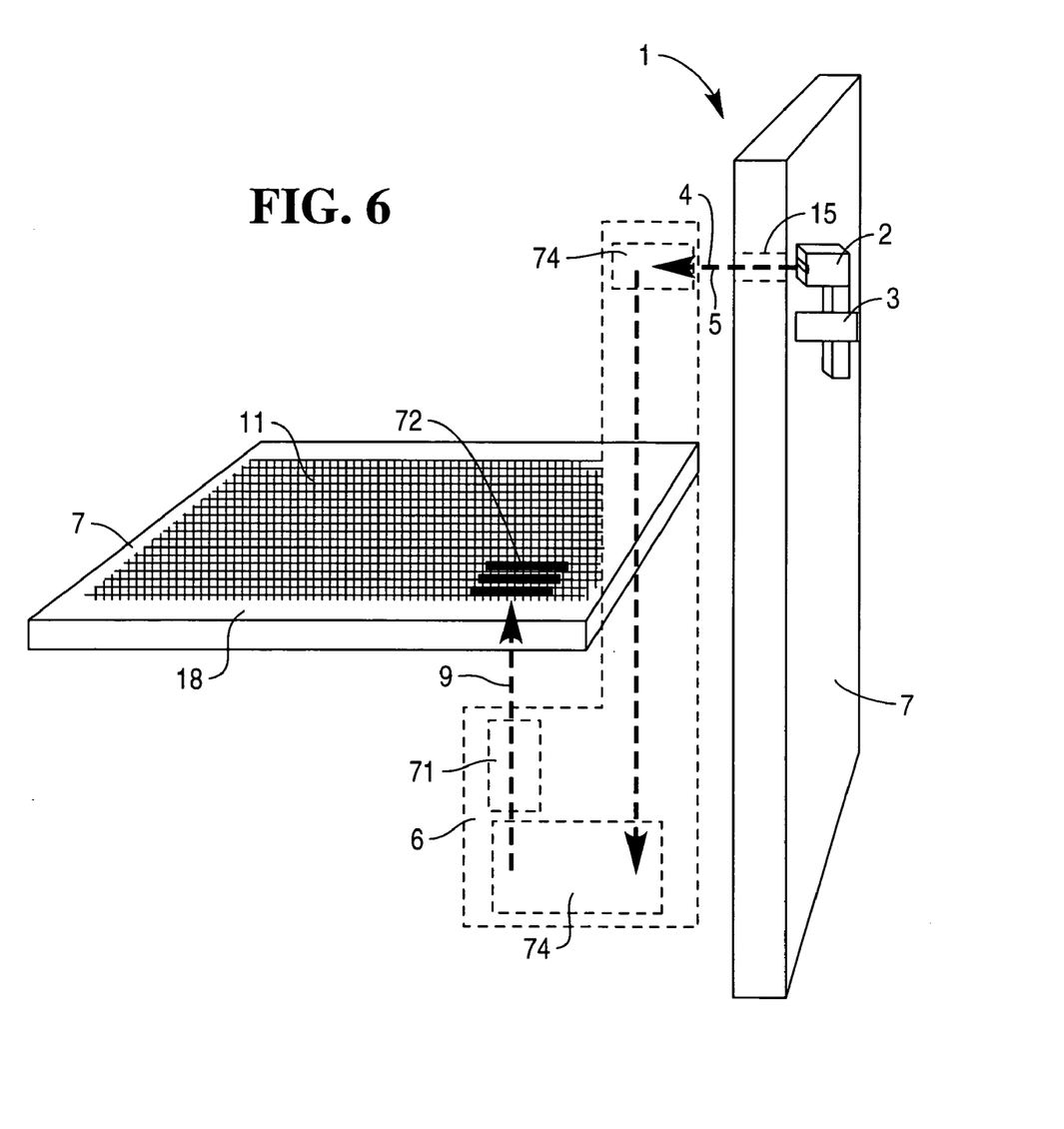
FIG. 6 is a cutaway perspective representation of an alternate system for mounting a handheld barcode scanner.

FIG. 6 illustrates an alternate embodiment. In this embodiment, system 1 is used to provide a 2D barcode reading functionality to scanner 7. It will be appreciated that such a functionality is typically not provided on a bi-optic scanner.

Assembly 6 includes a rastering module 71 that rasters a standard line pattern, such as that provided by beam 4, to provide a 2D barcode reading pattern 72. Module 71 includes either a motor or air driven turning mirror. Those skilled in the art will recognize appropriate rastering modules for this purpose. Assembly 6 also includes a plurality of turning components 74 for directing 2D reading beam 9 upward into window 18.

The nature of assembly 6 and power of scanner 2 will affect the visibility of pattern 72. In embodiments where pattern 72 is not substantially visible, a marking is provided on window 18 to identify the location of beam 9 for the purpose of 2D barcode reading.

In further embodiments other assemblies 6 are used. For example, in one embodiment beam 9 takes the form of a bi-optic style beam array, and is directed to read a side of an item not previously read by scanner 7. In such a case assembly 6 typically includes an additional scanning window, for example being located vertically above and facing window 18. In further embodiments assembly 6 defines a beam 9 in the form of two discrete beams—for example one producing a pattern 29 and another producing a pattern 72.

It will be appreciated that the above disclosure provides a system for mounting a handheld scanner to a bi-optic scanner such that the bi-optic scanner is provided with a supplemental functionality. This often has the effect both of increasing overall POS system throughput and making efficient use of available resources.

Although the present invention has been described with particular reference to certain preferred embodiments thereof, variations and modifications of the present invention can be effected within the spirit and scope of the following claims.

What is claimed is:

1. A system for mounting a handheld barcode scanner, the system including:
   a cradle for releasably mounting the handheld scanner such that the handheld scanner provides a first scanning beam in a predetermined first scanning path; and
   an optical assembly mountable to a bi-optic scanner for receiving the first scanning beam and in response providing a second scanning beam in a second scanning path to supplement a third scanning beam provided by the bi-optic scanner independently of the handheld scanner.

2. A system according to claim 1 wherein the handheld scanner is responsive to scanning alignment of a barcode in the second scanning path for reading the barcode.

3. A system according to claim 1 wherein the first scanning beam is displayable on a planar surface as a line pattern.

4. A system according to claim 1 wherein the optical module includes a turning mirror for re-directing the first scanning beam.

5. A system according to claim 1 wherein the optical module includes a magnifier for magnifying the first scanning beam.

6. A system according to claim 1 wherein the optical assembly includes a rastering component.

7. A system according to claim 6 wherein the rastering component translates a line pattern into a 2D barcode reading pattern.

8. A system according to claim 1 wherein the cradle is fixedly mountable to the bi-optic scanner.

9. A system according to claim 1 wherein the optical assembly is substantially containable within the bi-optic scanner.

10. A system according to claim 1 wherein the cradle includes a terminal engageable with a complimentary socket on the handheld scanner for providing electrical power to the handheld scanner.

11. A system according to claim 1 wherein the bi-optic scanner includes a scanning window and the second scanning beam is directed toward an inner surface of the scanning window.

12. A system according to claim 11 wherein the second scanning beam is visible as a line pattern extending across a portion of the scanning window.

13. A system according to claim 11 wherein the second scanning beam is visible as a 2D barcode reading pattern on the scanning window.

14. A system according to claim 1 wherein the handheld scanner is responsive to scanning alignment of the second scanning beam and a barcode for providing a first data packet to a processing unit and the bi-optic scanner is responsive to scanning alignment of the third scanning beam with a barcode for providing a second data packet to the processing unit.

15. A system according to claim 14 wherein the processing unit is responsive to receiving a like first and second data packet within a predetermined time period for performing an action.

16. A system according to claim 15 wherein the action is disregarding one of the first and second data packets.

17. A system according to claim 15 wherein the action is providing a message to an operator of either or both of the scanners.

18. A system according to claim 1 wherein the bi-optic scanner includes a plurality of turning mirrors for producing the third scanning beam from a beam source, and the optical assembly includes one or more of these turning mirrors.

19. A mount for a handheld scanner, the mount including:
    a cradle for releasably mounting the handheld scanner such that the handheld scanner provides a first scanning beam to an optical assembly mounted to a bi-optic scanner, the assembly being responsive to the first beam for providing a second scanning beam in a second scanning path to supplement a third scanning beam provided by the bi-optic scanner independently of the handheld scanner.

20. An optical assembly mountable to a bi-optic scanner, the assembly including:
    an input for receiving a first scanning beam from a handheld scanner;
    an optical module optically associated with the input and responsive to the first scanning beam for providing a second scanning beam; and
    an output optically associated with the module for providing the second scanning beam in a second scanning path such that the second scanning beam supplements a third scanning beam provided by the bi-optic scanner independently of the handheld scanner.

21. A bi-optic scanner for providing a bi-optic scanning beam outwardly through at least one window, the scanner including:
    a cradle for releasably retaining a handheld scanner that provides a handheld scanning beam independently of the bi-optic scanner, wherein the handheld scanning beam supplements the bi-optic scanning beam; and
    an optical assembly for receiving the first scanning beam and in response providing a further scanning beam outwardly through one of the windows.

22. A bi-optic scanner according to claim 21 wherein the optical assembly is responsive to receiving the handheld scanning beam for providing a further scanning beam outwardly through more than one of the windows.

* * * * *